United States Patent [19]

Sasaki et al.

[11] Patent Number: 5,007,288
[45] Date of Patent: Apr. 16, 1991

[54] HEAT-RADIATION TYPE LEVEL SENSOR

[75] Inventors: Kazuyuki Sasaki; Ichiro Kataoka, both of Susono, Japan

[73] Assignee: Yazaki Corporation, Tokyo, Japan

[21] Appl. No.: 444,341

[22] Filed: Dec. 1, 1989

[30] Foreign Application Priority Data

Dec. 2, 1988 [JP] Japan ............................ 63-156629[U]
Dec. 12, 1988 [JP] Japan ................................ 63-311927

[51] Int. Cl.$^5$ .............................................. G01F 23/24
[52] U.S. Cl. .................... 73/295; 73/304 R; 324/721
[58] Field of Search ............. 73/295, 304 R; 324/721; 338/13, 34

[56] References Cited

U.S. PATENT DOCUMENTS

| | | | |
|---|---|---|---|
| 3,205,709 | 9/1965 | Gearing et al. | 73/295 |
| 4,163,391 | 8/1979 | Bezard et al. | 73/304 R X |
| 4,217,544 | 8/1980 | Schmidt | 324/721 X |
| 4,525,850 | 6/1985 | Miller | 73/295 |
| 4,717,811 | 1/1988 | Fujii | 324/721 X |

FOREIGN PATENT DOCUMENTS

| | | |
|---|---|---|
| 62-176729 | 11/1987 | Japan . |
| 64-63820 | 3/1989 | Japan . |
| 1-117527 | 8/1989 | Japan . |
| 1-117529 | 8/1989 | Japan . |

Primary Examiner—Daniel M. Yasich
Attorney, Agent, or Firm—Armstrong, Nikaido, Marmelstein, Kubovcik & Murray

[57] ABSTRACT

A heat radiating type liquid level sensor comprises a liquid level measuring resistor having a first temperature coefficient and an inverting amplifier gain of which is dependent on the change in resistance of an input resistor thereof. The input resistor has a second temperature coefficient. The liquid level measuring resistor and the input resistor are placed side by side so that the input resistor can experience the same ambient temperature as the liquid level measuring resistor. The first temperature coefficient is set to a greater value than that the second temperature coefficient taking into consideration the temperature dependency of the resistor-to-air thermal resistance Rth of the liquid level measuring assembly, the temperature coefficient of the liquid level measuring resistor Ro, changes in liquid level due to thermal expansion of the liquid, and the maximum liquid level of the liquid tank, so that the liquid level sensor can provide an output indicative of the total weight of the liquid in the liquid tank. The desired value of the second temperature coefficient may be achieved by combining, in series connection or parallel connection, a resistor Ri of the same lot as the liquid level measuring resistor Ro is manufactured and a resistor Rs that has a negligibly small temperature coefficient as compared to that of Ri.

3 Claims, 5 Drawing Sheets

HEAT-RADIATION TYPE LEVEL SENSOR

BACKGROUND OF THE INVENTION

1. Field of the Invention

The present invention relates to a heat-radiation type liquid-level sensor output of which indicates the present weight of the liquid in a tank.

2. Prior Art

The resistance of an electrical resistor increases with an increase in temperature as shown in FIG. 6 and a change in resistance is proportional to the temperature of the electrical resistor. For example, when a current from a constant current source Io flows through a liquid level measuring resistor Ro such as an Ni wire of a predetermined length as shown in FIG. 7B, the resistor generates an amount of heat to increase the resistance of the resistor Ro. If this heat-generating resistor Ro is substantially dipped in liquid, the resistance thereof will decrease. This is because the thermal resistance between the resistor and the liquid surrounding the resistor when the resistor is placed in liquid is smaller than that between the resistor and the gas surrounding the resistor when the resistor is placed in air. The overall resistance of Ro will be smaller with increasing length of the resistor Ro dipped in the liquid as shown in FIG. 7A; therefore the voltage drop across the resistor Ro will decrease. This indicates that detecting the voltage variation across the resistor Ro enables the measurement of the level of the liquid.

The voltage $V_{(x)}$ across the resistor Ro is given as follows:

$$V(x) = IRo' \left( \frac{X}{1 - Ka} + \frac{L - X}{1 - Kb} \right) \quad (1)$$

where

L: total length of the resistor Ro,
X: length of the resistor Ro dipped in the liquid,
Kb: non-dimensional quantity which is a function of, for example, a thermal resistance, and causes a change in surface temperature of the resistor Ro relative to that of the air with which the resistor contacts when the current flows through the resistor,
Ro': resistance per unit length of the resistor Ro,
Ka: non-dimensional quantity which is a function of, for example, a thermal resistance that causes a change in surface temperature of the resistor relative to that of the liquid with which the resistor contacts when the current flows through the resistor, and there is a relation of $1 > Kb > Ka$.

FIG. 4 shows one conventional temperature-compensated heat radiation type liquid level sensor. In FIG. 4, the resistor Ro is a liquid level measuring resistor made of, for example, a length of nickel wire and Rt is a temperature compensating resistor, made of an electrically conductive wire similar to the Ro, and Rf is a feedback resistance having a temperature coefficient negligible compared to those of the resistors Ro, Rt. Rt does not generate a significant amount of heat compared to the resistor Ro because little current flows through the temperature compensating resistor Rt.

One end of the liquid level measuring resistor Ro' is grounded and the other end thereof is connected with a constant current source Io so that a constant current I flows through the resistor Ro.

The voltage across the resistor Ro is fed through a buffer amplifier A which has a unity gain and serves to isolate the resistor Ro from a succeeding circuit. The output of the buffer amplifier A is supplied to an inverting feedback amplifier which is constructed of an operational amplifier Op, the temperature compensating resistor i.e., input resistance Rt, and the feedback resistor Rf. The gain of the feedback amplifier is given by Rf/Rt, therefore the gain will decrease with temperature if Rt increases with temperature. The change in resistance of the resistor Ro appears as a voltage change across a point a and the ground in accordance with the change in liquid level, and is supplied to the inverting feedback amplifier through the buffer amplifier A. The voltage is then amplified by the inverting feedback amplifier to be outputted as a voltage indicative of the liquid level.

The resistor Rt is disposed in a liquid tank such that it experiences the same ambient temperature as the resistor Ro does. Since the resistor Rt does not generate the detectable amount of heat, the resistance thereof is not affected by the change in liquid level but is dictated by only the ambient temperature, i.e., liquid temperature and air temperature. When the voltage across the resistor Ro increases with the ambient temperature, the input voltage to the inverting feedback amplifier also increases. At this time, the resistance of the resistor Rt also increases and therefore the gain of the inverting feedback amplifier decreases. As a result, the output of the inverting feedback amplifier does not change. In this manner, the error due to the change in resistance of the measuring resistor Ro is compensated by the change in resistance of the compensating resistor Rt.

The voltage at a point b is given by the following equation.

Selecting Rf=Rt and selecting the temperature coefficient of Rt equal to that of $\alpha_0$ of Ro, $$V(x) = \frac{IRo'(1 + \alpha_o - \Delta T)\left(\frac{X}{1 - Ka} + \frac{L - X}{1 - Kb}\right)}{\frac{Rt(1 + \alpha_o \cdot \Delta T)}{Rf}} \quad (2)$$

$$V(x) = IRo'\left(\frac{X}{1 - Ka} + \frac{L - X}{1 - Kb}\right)$$

$\Delta T$: a change in ambient temperature.
$\alpha_0$: temperature coefficient of the resistor Ro, Rt and is given;

$$\alpha_o = \frac{(Ra - Rb)}{(Ta - Tb)Ra}$$

where

Ra: the resistance at a temperature Ta,
Rb: the resistance at a temperature Tb.

The thermal resistance from resistor to air of the resistor Ro is greater than the thermal resistance from resistor to liquid of the same resistor Ro. Thus it can be said that $1 > Kb > Ka$.

The above-described prior art level liquid sensor is of a type in which the liquid level measuring resistor Ro in the form of, for example, a length of wire is supported at both ends thereof by a supporting member so that the resistor wire is held taut. Therefore, when handling the liquid measuring resistor in the form of wire or ribbon, care must be taken so that the resistor is not damaged or cut off. In addition, the effect of liquid level change due to thermal expansion thereof is not compensated.

SUMMARY OF THE INVENTION

In the present invention, the temperature coefficients $\alpha_0$ of the liquid level measuring resistor Ro is set to be greater than that $\alpha_t$ of the temperature compensating resistor Rt taking into consideration the temperature dependency of the resistor-to-air thermal resistance Rth of the liquid level measuring assembly, the temperature coefficient of the liquid level measuring resistor Ro, the changes in liquid level due to thermal expansion of the liquid, and the maximum liquid level of the liquid tank, so that the liquid level sensor according to the present invention can provide an output indicative of the total weight of the liquid in the liquid tank. The desired temperature coefficient of the temperature compensating resistor Rt may be achieved by combining, in series connection or parallel connection, a resistor Ri of the same lot as the liquid level measuring resistor Ro is manufactured and a resistor Rs that has a negligibly small temperature coefficient as compared to that of Ri.

BRIEF DESCRIPTION OF THE DRAWINGS

Features and other objects of the invention will be more apparent from the description of preferred embodiments with reference to the accompanying drawings in which.

DESCRIPTION OF PREFERRED EMBODIMENTS

First Embodiment

Figure 1A:
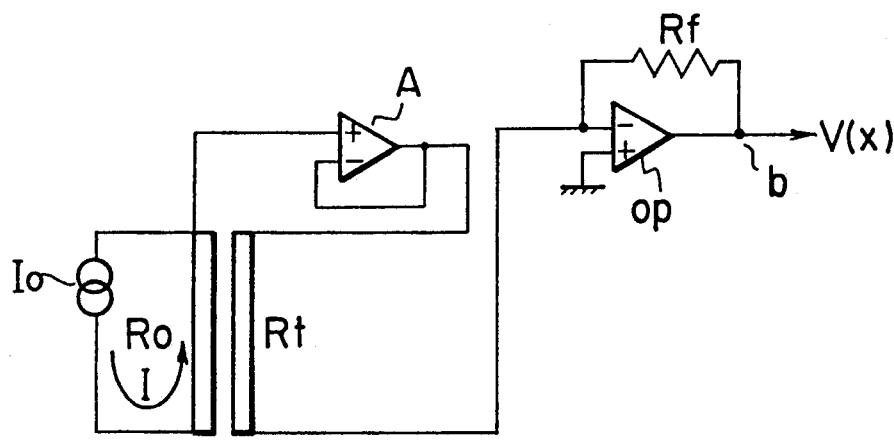
FIG. 1A shows a first embodiment of a heat radiation type level sensor according to the present invention.
Figure 4:
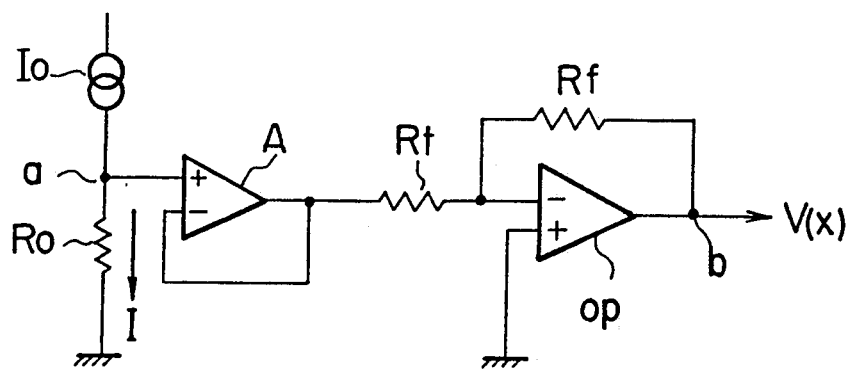
FIG. 4 illustrates a prior art heat radiation type liquid level sensor.

The present invention will now be described with reference to the drawings. Elements in FIG. 1A corresponding to those in FIG. 4 have been given the same references. Referring to FIG. 1A, a liquid level measuring resistor Ro and a temperature compensating resistor Rt are disposed side by side so that the resistor Rt can experience the same ambient temperature as the resistor Ro does.

Figure 1B:
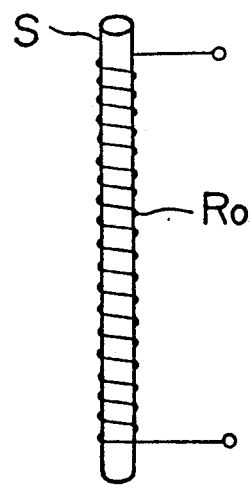
FIG. 1B shows an embodiment of a liquid level measuring assembly according to the present invention.
Figure 5:
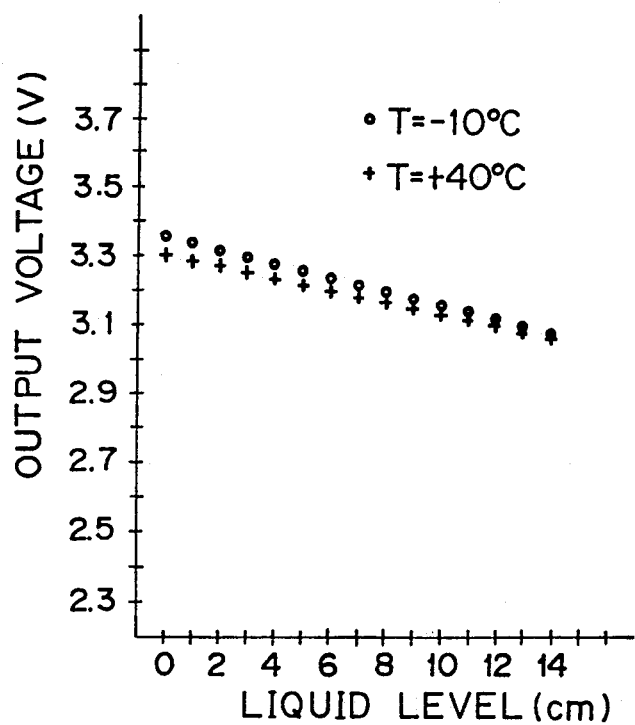
FIG. 5 shows liquid level vs output voltage of the sensor when a liquid level measuring assembly in FIG. 1B is used in place of Ro in FIG. 4.
Figure 6:
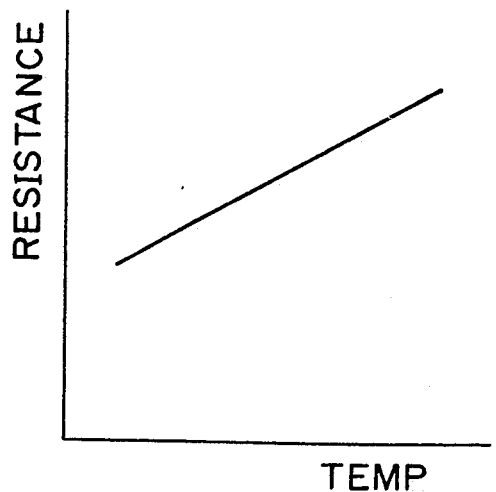
FIG. 6 shows a general relationship of the resistance of a resistor vs ambient temperatures thereof.
Figure 7A:
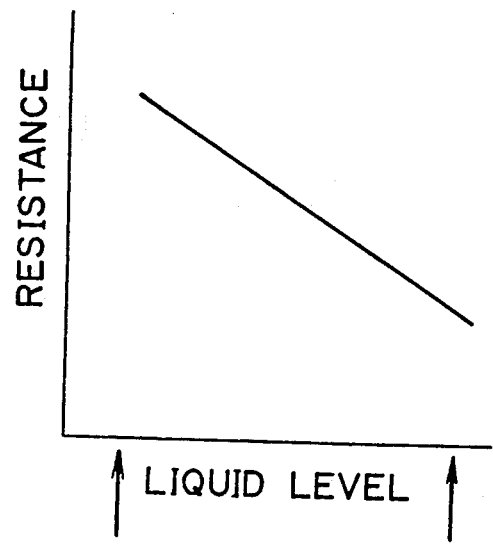
FIG. 7A shows changes in resistance of the resistors Ro vs the liquid level.
Figure 7B:
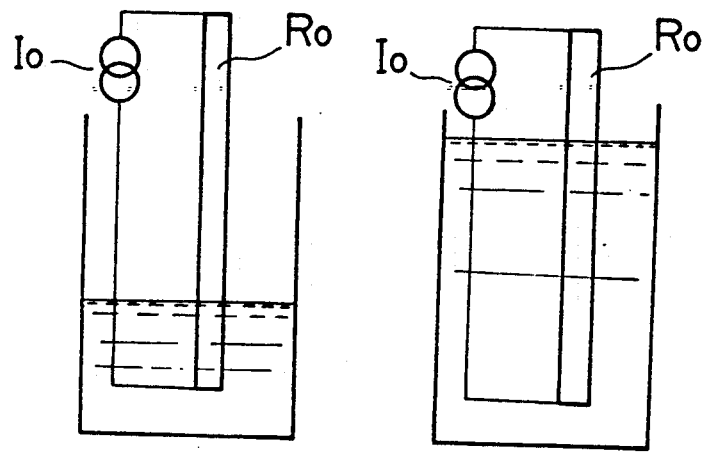
FIG. 7B shows the liquid level measuring resistor Ro and the liquid level that corresponds to FIG. 7A.

FIG. 1B is a perspective view of a liquid level measuring assembly according to the present invention. A length of wire resistor Ro is wound around a rod-shaped support means S. In this manner, the liquid level measuring assembly is formed in a unitary construction of the support means S and the wire resistor Ro. This construction is easy to handle. However, this arrangement causes the thermal resistance of the liquid level measuring assembly to become temperature dependent, particularly the assembly-to-air thermal resistance. It is vitally important to choose the material of the rod and the winding pitch of the wire resistor as well as various dimensions of the liquid level measuring assembly. FIG. 5 shows the relation of liquid level vs output voltage when the liquid level measuring assembly in FIG. 1B is used in place of Ro of the prior art sensor in FIG. 4. The temperature dependency of the assembly-to-air thermal resistance accounts for the discrepancy between the two graphs in FIG. 5, particularly at low liquid levels. It should be noted that the graphs in FIG. 5 do not take into account the effect of the liquid level variation due to thermal expansion of liquid volume. It should be noted that the smaller slope of the graph at the high temperature indicates that the assembly-to-air thermal resistance of the liquid level measuring assembly decreases with increasing temperature, as shown by Equation (1). This problem is solved by carefully setting the temperature coefficient of the temperature compensating resistor Rt, as will be described later.

Figure 9:
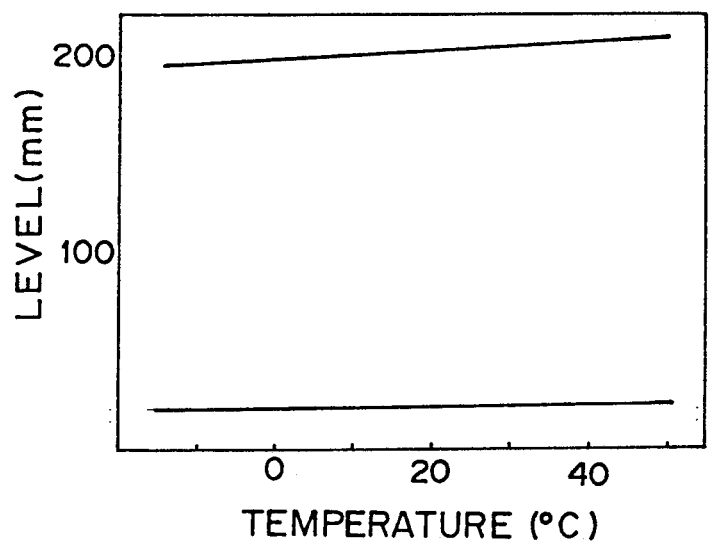
FIG. 9 shows the variation in liquid level of a certain type of liquid to which the present invention is applied.

Now, let's consider the output voltage V(x) in terms of thermal expansion of the liquid. FIG. 9 shows the variation in liquid level of a certain type of liquid to which the embodiment is applied. It is appreciated that the change in liquid level with temperature is greater at the higher liquid level than at the lower liquid level. For the same weight of liquid, the liquid level increases with increasing temperature due to thermal expansion, therefore the lengths of the resistor Ro which is substantially dipped in the liquid will increase, correspondingly causing the decrease in the overall resistance of the respective resistors Ro. That is, for the same liquid tank, the variation in output voltage V(x) with temperature becomes large with increasing the weight, that is, the level of the liquid. In order that the output voltage of the liquid level sensor indicates the correct weight of the liquid in the tank at any ambient temperature, it is necessary to compensate for the inherent temperature coefficient of the resistor Ro, the temperature dependency of the thermal resistance of the liquid level measuring assembly when the resistor Ro radiates the heat to environment thereof, and the liquid level change of the liquid due to thermal expansion of the liquid volume.

Even if the liquid is filled in a tank of a different volume and a shape, the output of the sensor can provide an output representative of the correct weight of the liquid as far as the liquid level when the tank is full is the same.

In the present invention, Ro is given a temperature coefficient larger than that of Rt taking into consideration the temperature dependency of the assembly-to-air thermal resistance Rth of the liquid level measuring assembly, the temperature coefficient of the resistor Ro, the change in liquid level due to thermal expansion of the liquid, and the maximum liquid level of the liquid when the tank is full so that the liquid level sensor according to the present invention can output voltage corresponding to the total weight of the liquid in the liquid tank; therefore Eq. (2) is rewritten as follows:

$$V(x) = IRO' \frac{(1 + \alpha_o \cdot \Delta T)}{(1 + \alpha_t \cdot \Delta T)} \left( \frac{X}{1 - Ka} + \frac{L - X}{1 - Kb} \right) \quad (3)$$

Kb is a function of the assembly-to-air thermal resistance Rth of the liquid level measuring assembly according to the invention, and is given as follows:

$$Kb = \alpha_0 \cdot I^2 \cdot Ro \cdot Rth$$

Since the thermal resistance Rth is temperature dependent, Kb is temperature dependent.

As previously mentioned, the assembly-to-air thermal resistance when the liquid level measuring assembly is placed in air is greater than the assembly-to-liquid thermal resistance when the liquid level measuring assembly is placed in liquid.

Figure 2:
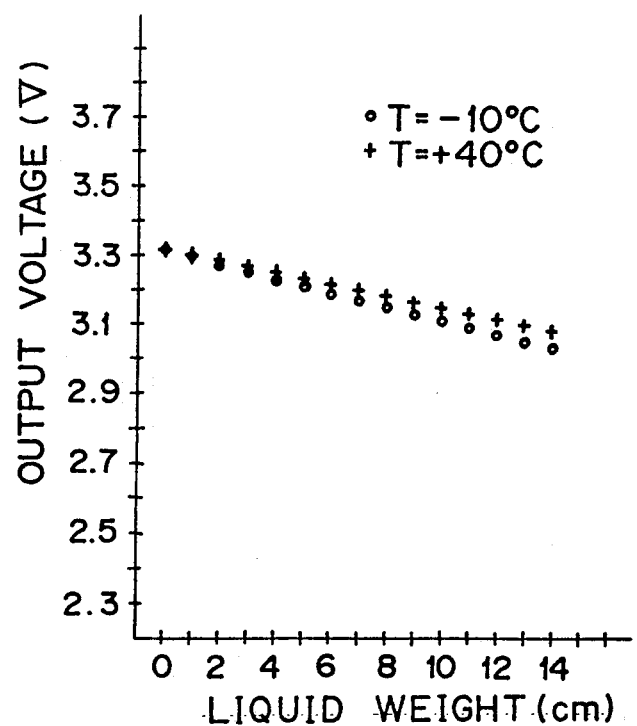
FIG. 2 shows a relation of liquid level vs output voltage of the sensor for illustrating the operation of the sensor in FIG. 1A.
Figure 3:
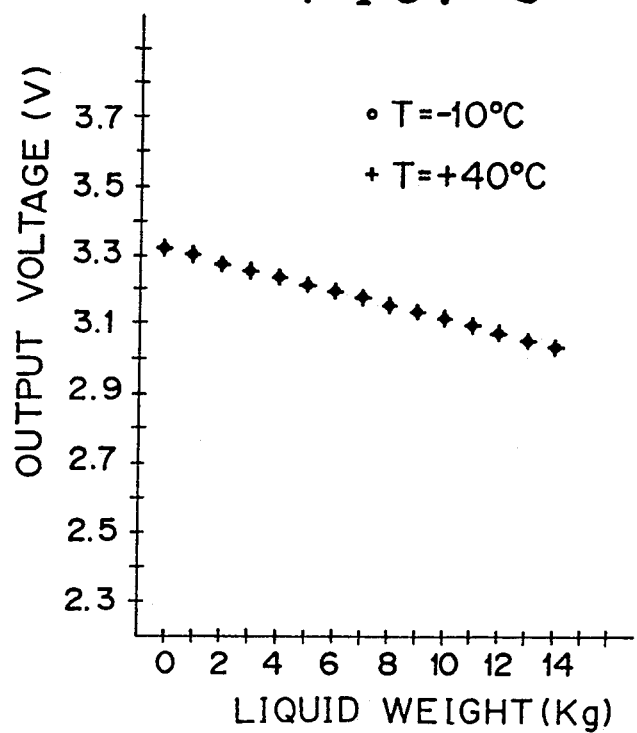
FIG. 3 shows a relation of liquid weight in a tank vs output voltage of the sensor in FIG. 1A.

Thus, for the same change in the ambient temperature, a change in $1/(1-Kb)$ is greater than that in $1/(1-Ka)$. As previously mentioned, the temperature dependency of the assembly-to-air thermal resistance accounts for the discrepancy between the two graphs in FIG. 5, particularly at low liquid levels. It should be noted, from FIG. 5, that the assembly-to-air thermal resistance decreases with increasing ambient temperature. In other words, varying the degree of the temperature dependency of the assembly-to-thermal resistance allows adjustment of the slopes of the two graphs in FIG. 5. Also, it is appreciated that if the $\alpha_0$ is set to a value different from $\alpha_t$, then the graphs in FIG. 5 simply shifts either upwardly or downwardly but the slopes of the graphs will not change. By choosing a suitable value of the temperature coefficient at and the temperature dependency of the assembly-to-air thermal resistance, it is possible to compensate for the variation of the output voltage due to the temperature coefficient of the liquid level measuring resistance and the change in liquid level due to the thermal expansion of the liquid. Thus, the liquid level measuring assembly having the output given by Eq: (3) will show the temperature characteristic as shown in FIG. 2. It should be noted that the graphs in FIG. 2 do not take into account the effect of the liquid level variation due to thermal expansion.

Now let's consider the effect of thermal expansion of the liquid on the output voltage of the liquid level measuring assembly with reference to FIG. 2. An increase in ambient temperature causes an increase in liquid level which tends to cool the resistor Ro; therefore the output voltage goes down. This operation causes the output voltage at the high temperature to decrease significantly at higher liquid level, thereby tending to cause the two graphs in FIG. 2 to coincide with each other.

In this manner, a heat radiation type liquid level sensor according to the present invention provides the output voltage representative of the weight of the liquid without being affected by the temperature coefficient of the liquid level measuring resistor, the temperature dependency of the assembly-to-air thermal resistance of the liquid level measuring assembly, and the thermal expansion of the liquid.

In the present invention, it is very important to set the assembly-to-air thermal resistance of the liquid level measuring assembly and temperature coefficient of the thermal resistance.

In the present invention, the temperature coefficient $\alpha_0$ of the liquid level measuring resistor Ro is set to a greater value than that $\alpha_t$ of the temperature compensating resistor Rt taking into consideration the temperature dependency of the assembly-to-air thermal resistance Rth of the liquid level measuring assembly, the temperature coefficient of the liquid level measuring resistor Ro, the change in liquid level due to thermal expansion coefficient of the liquid, and the maximum liquid level of the liquid tank, so that the liquid level sensor according to the present invention can provide the output voltage corresponding to the total weight of the liquid in the liquid tank.

Second Embodiment

Figure 8:
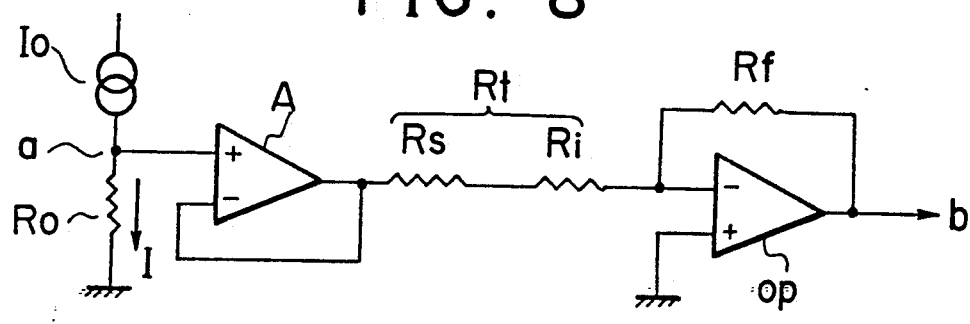
FIG. 8 shows a second embodiment of the invention.

FIG. 8 shows a second embodiment of the invention.

Resistors may possibly have slightly different temperature coefficients due to small variations in compositions, manufacture conditions, and heat treatment etc. even if the resistors are manufactured in the same production line and procedure. Therefore, manufacturing the resistors having a desired temperature coefficient requires a very high level of control and supervision of manufacturing process. Thus, it is not easy to manufacture Ro having a temperature coefficient not only larger than that of Rt but also a desired value.

Fortunately, resistors in the same lot can be expected to have a sufficiently small variation in composition, manufacturing conditions, heat treatment and so on. The temperature compensating resistor Rt may be formed by combining a resistor Ri of the same lot as the liquid level measuring resistor Ro is manufactured and a resistor Rs that has a negligibly small temperature coefficient as compared to that of Ri and Ro. In this manner the desired temperature coefficient of the temperature compensating resistor Rt can be obtained at a relatively low cost. The combination of the two resistors Ri and Rs may be either in the form of a series circuit or in the form of a parallel circuit.

Industrial Applicability

As described above, according to the present invention, the temperature coefficients of the liquid level measuring resistor Ro is set to a value greater than that of the temperature compensating resistor Rt, taking into consideration the temperature dependency of the resistor-to-air thermal resistance Rth of the liquid level measuring assembly, the temperature coefficient of the liquid level measuring resistor Ro, changes in liquid level due to thermal expansion of the liquid, and the maximum liquid level of the liquid tank.

The desired temperature coefficient of the temperature compensating resistor Rt can be obtained at a relatively low cost by combining, either in series connection or in parallel connection, the first resistance having the same temperature coefficient as the liquid measuring resistor and the second resistor having a temperature coefficient negligibly small as compared to those of both the liquid measuring resistor and the temperature compensating resistor.

While the invention has been particularly shown and described in reference to preferred embodiments thereof, it will be understood by those skilled in the art that changes in form and details may be made therein without departing from the spirit and scope of the invention.

What is claimed is:

1. A heating radiating type liquid level sensor for indicating the weight of liquid within a tank, comprising:

a liquid level measuring assembly having a liquid level measuring resistor, said liquid level measuring resistor having a first temperature coefficient that causes a change in resistance due to an amount of heat generated when a current from a current source flows therethrough, said liquid level measuring resistor is substantially dipped in said liquid, with a level thereof being measured, when said liquid is filled to a maximum level in said tank;

a buffer amplifier for amplifying and outputting a voltage developed across said liquid level measuring resistor when said current flows therethrough; and an inverting feedback amplifier for amplifying said voltage outputted from said buffer amplifier, said voltage outputted from said buffer amplifier representing the weight of said liquid within said tank, said inverting feedback amplifier having a feedback resistor and a series input resistor which has a second temperature coefficient, said series input resistor being substantially dipped in said liquid when said liquid is filled to a maximum level in said tank and functioning as a temperature compensating resistor, wherein said first temperature coefficient is larger than said second temperature coefficient.

2. A heat radiating type liquid level sensor according to claim 1, wherein said liquid level measuring assembly includes a support means around which said liquid level measuring resistor is wound, said liquid level measuring assembly having assembly-to-air thermal resistance which has a temperature dependency, said second temperature coefficient having a value which compensates for said temperature dependency of said assembly-to-air thermal resistance of said liquid level measuring assembly, said temperature coefficient of said liquid level measuring resistor $R_o$, and changes in liquid level due to a thermal expansion of said liquid so as to have said voltage being outputted from said buffer amplifier substantially represent the weight of said liquid within said tank.

3. A heat radiating type liquid level sensor according to any one of claim 1 and claim 2, wherein said temperature compensating resistor is formed of a combination of a first resistor having the same temperature coefficient as said liquid measuring resistor and a second resistor having a temperature coefficient substantially less than temperature coefficients of both said liquid measuring resistor and said temperature compensating resistor.

* * * * *